March 11, 1930.                 A. COPONY                 1,749,758
            LOADING OR DECKING DEVICE FOR AUTOMOBILES IN FREIGHT CARS
                        Filed Jan. 21, 1927        2 Sheets-Sheet  2
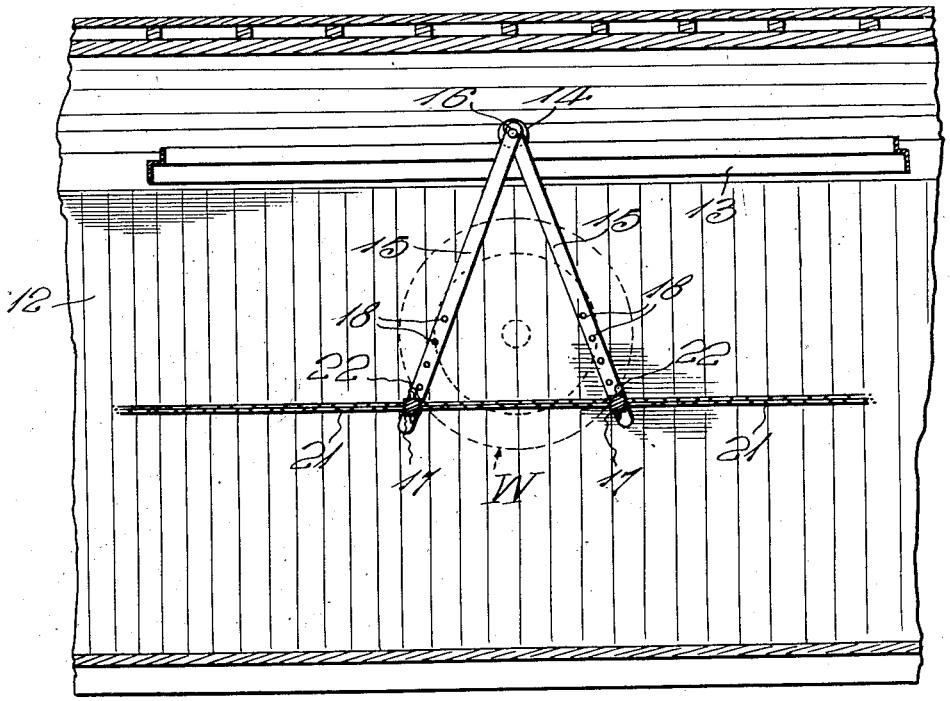
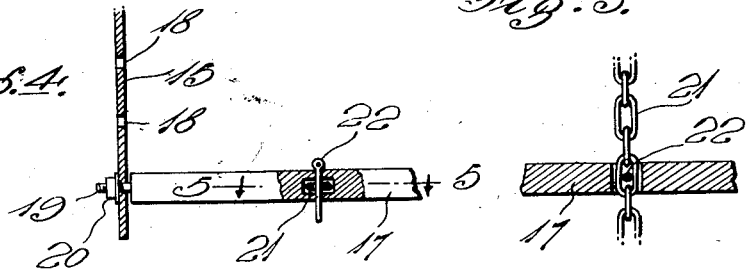
INVENTOR
ALFRED COPONY Patented Mar. 11, 1930

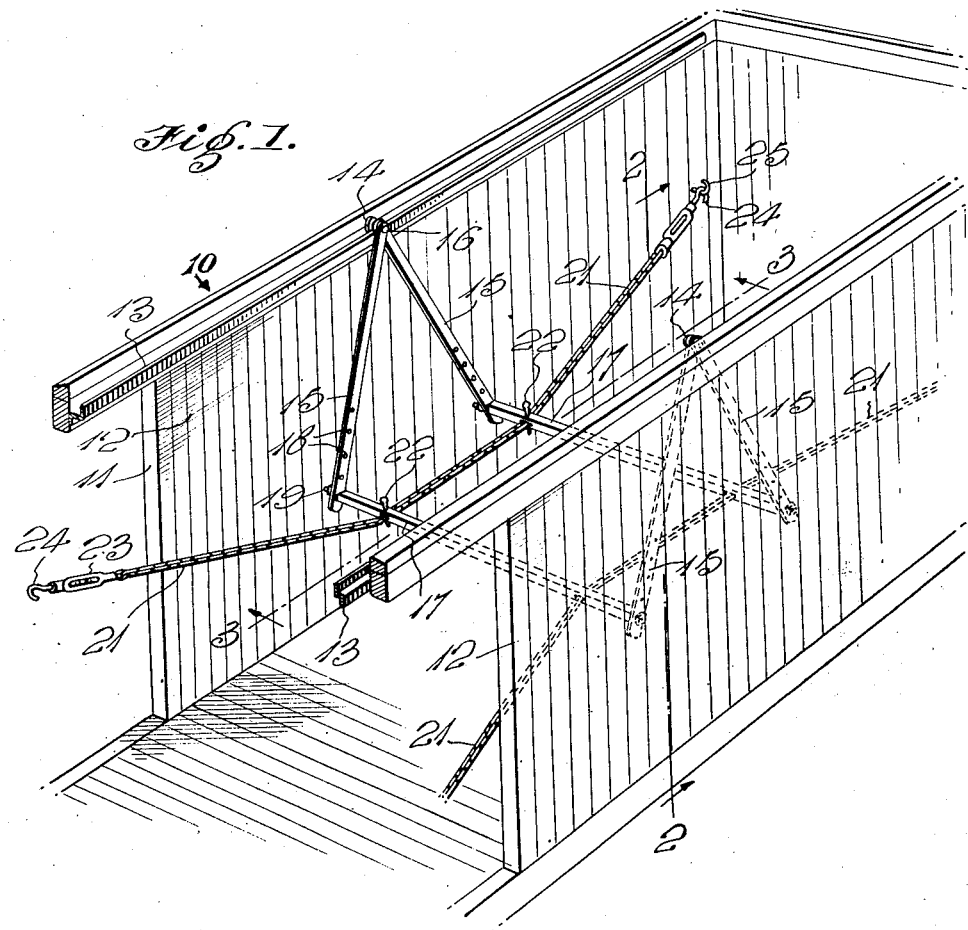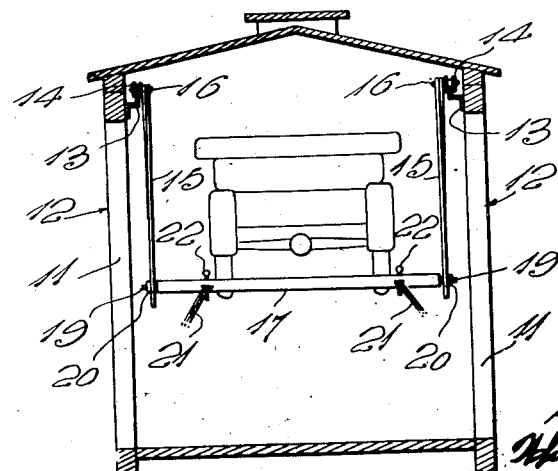

1,749,758

UNITED STATES PATENT OFFICE

ALFRED COPONY, OF MOUNT CLEMENS, MICHIGAN, ASSIGNOR TO COPONY AUTO LOADING COMPANY, OF DETROIT, MICHIGAN, A CORPORATION OF MICHIGAN

LOADING OR DECKING DEVICE FOR AUTOMOBILES IN FREIGHT CARS

Application filed January 21, 1927. Serial No. 162,641.

This invention relates to loading or decking devices for automobile cars and more particularly to improvements in devices of this character tending to simplify, render more efficient and improve the same generally.

The invention relates to permanent decking devices and consists essentially of carriers engageable with the wheels of the vehicle and mounted by means of suspension devices upon rails running longitudinally of the car. The carriers are movable longitudinally of the car along the said rails so that after loading the vehicles at, for instance, the door of the car they may be moved away from the loading point to the point of storage.

The invention has in view many objects and obtains numerous advantages in actual practice. One of the objects of the invention is to provide a decking device wherein the vehicles may be loaded at a single predetermined point in the railway car and then moved to the points of storage, in contradistinction to heretofore known devices wherein it was necessary to move the hoisting mechanism after loading each vehicle. Another object of the invention is to provide a decking device which requires no added or special fastening means for holding the automobile in loaded position and further to provide a decking device capable of adjustment so that the vehicles may be effectively braced against end shocks.

A still further object of the invention is to provide a device of this character wherein the necessity for cross bars at the door of the car is eliminated. Still another object of the invention is to provide a decking device which is inexpensive to manufacture and install, is capable of rapid adjustment and one that may be folded or collapsed and readily secured in this condition to the roof of the freight car.

The several objects, advantages and novel details of construction of one embodiment of the invention will be made more apparent as this description proceeds, especially when considered in connection with the accompanying drawings wherein Figure 1 is a fragmentary perspective view of a freight car showing my decking device in position.

Figure 2 is a vertical sectional view taken substantially on the plane indicated by line 2—2 in Figure 1;

Figure 3 is a longitudinal sectional view taken substantially on the plane indicated by line 3—3 in Figure 1;

Figure 4 is a detail view partly in section of one of the suspension members and the carrier bars secured to the same, and Figure 5 is a detail sectional view through one of the carrier bars showing a chain attached to the same.

Referring now particularly to the drawings wherein like reference characters indicate like parts it will be noted that there is illustrated fragmentarily a freight car 10 having door openings 11 and side walls 12. Secured longitudinally of the side walls 11 adjacent the upper edge thereof are Z-bar rails 13. Engaging the Z-bar tracks 13 are flanged wheels or rollers 14 to each of which a pair of suspension members 15 is pivotally connected as, for instance, by means of a pivot bolt 16. Extending transversely of the car are pairs of carrier bars 17 the ends of which are adjustably connected to the suspension members 15. For this purpose the suspension members may be provided with a plurality of spaced apertures 18 into which the reduced ends 19 of the carrier bar 17 extend. Nuts 20 threaded on the ends of the extensions 19 may be employed for securing these parts together.

In practice, as clearly suggested in the drawings, the wheels W of the automobile rest between the pairs of carrier bars 17 and for the purpose of holding these bars from spreading under the weight of the vehicle I provide a chain 21 which extends through openings in the carrier bars 17 and is connected thereto by means of pins 22 passed transversely through the bars and through links in the said chain. The ends of the chain are each provided with a turn-buckle 23 by means of which the effective length of the chain may be adjusted and with hooks 24 engageable with connections 25 arranged flush with the inside face of the car wall. In addition to the adjustment provided by the turn-buckles it will be obvious that the chains may be shortened by taking one or more turns around the bars 17.

While the carrier bars 17 are adjustably connected to the suspension members 15 for the purpose of accommodating the decking device to vehicles and freight cars of various sizes it will be noted that the outer of each pair of bars 17 of the set of decking devices employed in connection with each vehicle may be adjusted to a horizontal position above the plane of the other bar so as to effectively brace the vehicle against end shocks. While in many instances this may be unnecessary, nevertheless, this provides a simple but effective means for holding the vehicle against endwise displacement in transit.

When using the herein described decking device the automobile is first hoisted by means of block and tackle or chain falls to the roof of the freight car whereupon the assembled decking device is run under the automobile to a position in registration with the front and rear wheels so that the front wheels engage between one pair of bars 17 and the rear wheels between another pair of these carrier bars. When the automobile is thus deposited upon the decking device the chain falls are removed and the automobile is pushed longitudinally of the freight car into storage position, the rollers 14 running along the tracks 13 during this operation. In order to fasten the automobile in position for shipment it is then only necessary to engage the hooks 24 with the connections 25 in the side wall of the railway car and tighten the chains by means of the turn-buckles 23. Obviously no additional fastening means for holding the automobiles in place is required because the spaced carrier bars 17 effectively engage the wheels.

It is obvious that the entire freight car can be loaded from a single point and the automobiles moved from the loading to the storage points. When the freight car is unloaded the decking devices may be collapsed or folded together and swung upwardly and secured to the roof of the freight car. No cross bar is needed at the door opening because the bracing chains 21 can be made long enough so that they reach beyond the door opening. The present invention eliminates the use of nails employed in the present method of fastening to the floor and sides of the car and hence eliminates the expense and trouble involved in such methods of decking and loading. At the present time it is necessary for the shipper to pay for the transportation of the dunnage at the same rate as he pays for the automobile shipped and with the present decking device this will be eliminated.

While an embodiment of the invention has been described and illustrated herein somewhat in detail it will be readily apparent that the invention is capable of expression in other structures which differ specifically from the one herein illustrated and for this purpose reservation is made to make such changes in the essential and non-essential details of the invention as may come within the purview of the accompanying claims.

What I claim as my invention is:

1. In a vehicle decking device for freight cars, the combination with vehicle supporting means of means permitting movement of said supporting means within the freight car whereby the vehicles may be loaded at a single point in the car and then moved to selected points of storage.

2. In a vehicle decking device for freight cars, the combination of vehicle supporting means with means permitting movement of said supporting means longitudinally of the freight car whereby vehicles may be loaded at a single point in the car and then moved to selected points of storage.

3. In a vehicle decking device for freight cars, the combination of vehicle supporting means with means permitting movement of said supporting means longitudinally of the freight car and means for fastening said supporting means to the wall of the car.

4. In a vehicle loading and decking device for freight cars, a carrier for supporting a vehicle, and a trackway for said carrier secured to the freight car whereby said carrier may be loaded at a particular point in the car and then moved to a selected point of storage.

5. In a vehicle loading and decking device for freight cars, vehicle supporting means including spaced carrier bars engageable with the wheels of the vehicle, a trackway and means for mounting said vehicle supporting means upon said trackway to permit movement of the vehicle within the freight car.

6. In a vehicle loading and decking device, for freight cars, vehicle supporting means including spaced carrier bars engageable with the wheels of the vehicle, a trackway, means for mounting said vehicle supporting means upon said trackway to permit movement of the vehicle within the freight car and means for fastening said vehicle supporting means to said car.

7. In a vehicle loading and decking device for freight cars, vehicle supporting means including spaced carrier bars engaging the wheels of the vehicle, pivotally mounted suspension members therefor and means for adjustably connecting each bar to its suspension members, for the purpose set forth.

8. In a vehicle loading and decking device for freight cars, the combination with vehicle supporting means including adjustable wheel engaging carrier bars of adjustable fastening means for securing said vehicle supporting means in position in the freight car.

9. In a vehicle decking device for freight cars, a foldable vehicle supporting means and means for pivotally mounting said vehicle supporting means permitting the same to be folded and swung to a position adjacent the roof of the freight car.

10. A vehicle loading and decking device including in combination a carrier for engaging the wheels of a vehicle and means for adjusting one portion of the carrier with respect to another portion thereof to brace the vehicle against end shocks.

11. In a vehicle loading and decking device, a carrier including in combination a pair of spaced carrier bars adapted to engage the front and rear of one of the wheels of the vehicle and means whereby the horizontal plane of one of the said bars may be varied with respect to the other of the said bars to brace the vehicle against end shocks.

12. In a vehicle loading and decking device, a carrier including in combination a plurality of spaced carrier bars suspended for swinging movement with respect to each other and a member for holding said bars in spaced relation.

13. In a vehicle loading and decking device, a carrier including in combination a pair of spaced carrier bars, means for pivotally suspending said bars from a single point, and means for maintaining said bars in spaced relation to each other, said last mentioned means including a flexible member secured at spaced points to the said bars and having its end portions secured in fixed spaced relation to the point of suspension of the said bars.

In testimony whereof I affix my signature.

ALFRED COPONY.